G. BERGKVIST.
TIRE SHOE.
APPLICATION FILED JUNE 30, 1917.
1,273,135.
Patented July 23, 1918.
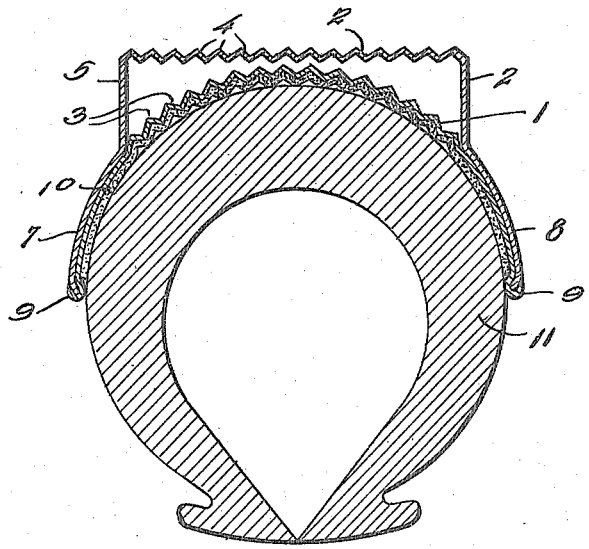
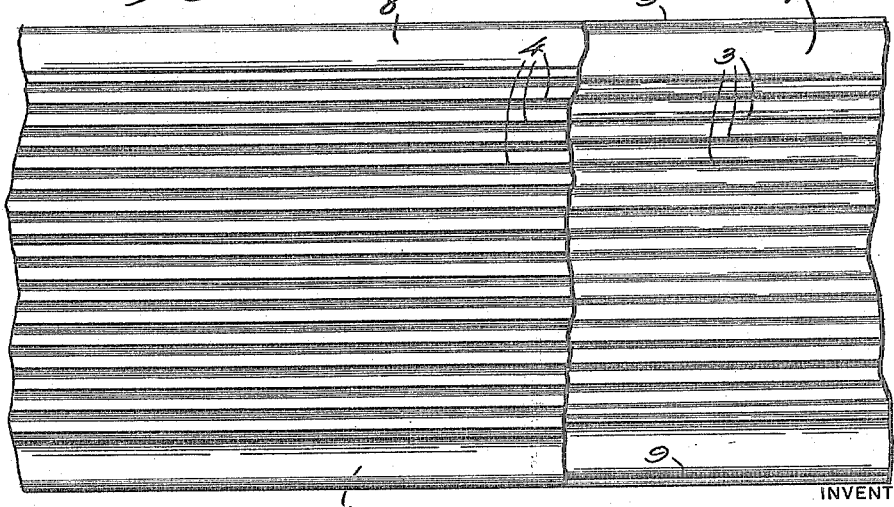
WITNESSES
INVENTOR
Gustaf Bergkvist
BY
ATTORNEY

UNITED STATES PATENT OFFICE.

GUSTAF BERGKVIST, OF MOSQUERO, NEW MEXICO.

TIRE-SHOE.

1,273,135.

Specification of Letters Patent.   Patented July 23, 1918.

Application filed June 30, 1917.   Serial No. 177,970.

*To all whom it may concern:*

Be it known that I, GUSTAF BERGKVIST, a citizen of the United States, residing at Mosquero, in the county of Union and State of New Mexico, have invented certain new and useful Improvements in Tire-Shoes, of which the following is a specification.

This invention relates to an improvement in tire shoes, and more particularly to such a structure intended for application to and use upon a pneumatic tire, it being a purpose of my invention to provide a metallic or other like covering constructed to present substantially a continuous sheet or ring entirely around the circumference of the tire and over the tread face thereof, and to yet, in as small a degree as is possible, reduce the flexibility and shock absorbing qualities of the pneumatic tire.

A further object is to so construct the protective covering that a broad tread surface is provided to thus give a better gripping and holding action.

Yet another object resides in providing for the protection of the pneumatic tire against heat generated in the metal parts through friction or through any other cause.

With the above and other objects in view, which will be in part described and in part understood from the specification, and claims, my invention consists in certain novel features of construction and combinations of parts which will be hereinafter more fully set forth.

In the drawings:—

Figure 1 is a sectional view taken transversely through a tire having my improved shoe fitted thereon; and, Fig. 2 is a view looking at the tread face and with parts broken away.

The shoe structure comprises in the main, the supporting member 1 and the tread member 2, both of which members are made of sheet metal, or other suitable material, stamped and bent to the proper form. The supporting member 1 is made in the form of a ring of slightly larger circumference than the tire to which it is to be fitted, and in cross section this supporting member is curved to fit substantially over the entire tread surface of the tire. The edges of the supporting member are left plain while the middle portion is corrugated circumferentially, as shown at 3, so that greater flexibility will be given to the members transversely, while at the same time ribs will be presented on the inner side to grip and to hold against the casing of the tire and thus mount the shoe against lateral shifting. The tread member 2 may also be made of a single piece of material cut and bent to the proper shape, and this tread member at its middle portion is made substantially flat transversely, the corrugations 4 however being provided circumferentially to roughen this tread face.

Shoulders 5 and 6 are provided at the sides of the tread portion, and the edges 7 and 8 of this member 2 are brought down to lie against the smooth edges of the member 1, the extreme edges of this member 1 being folded out and clenched down as shown at 9 to thus secure the two members together. An asbestos or other suitable lining sheet or strip 10 is disposed between the supporting member 1 and the casing 11, and thus the casing is protected against wear and also against heat which might be generated by rubbing of the members 1 and 2 against each other, or by friction incident to travel over the road.

In fitting the shoe in place, the casing will be forced into the curved lines of the member 1 before being placed upon the wheel, and when the tire is fitted in place and is inflated it will expand out against the sheet of protective material as indicated at 10 and thus the shoe will be secured and held against shifting upon the casing. When weight is placed upon the tread surface of the tread member 2, the weight will be transmitted solely or in part to the supporting member 1 from the edge portions 7 and 8 of this tread member 2 due to the fact that the edges of the member 1 are clenched over the edges of the member 2, however, when the load becomes excessive the corrugated portion 4 of the member 2 will be brought to bear against the corrugation 3 of the member 1, and in either event the fact that both of the members are corrugated will give a certain degree of elasticity and spring to both members and will consequently accomplish provision of a more flexible and more resilient shoe than would otherwise be provided.

From the foregoing it will be seen that I have provided a tire shoe which presents an armor protection entirely over the tread surface of a tire, and which structure is of such character that the shoe is not entirely fixed and inflexible, thus depending entirely upon the resiliency of the tire, but the shoe structure will give within itself and will conform to any inequalities in the road, while at the same time permitting the pneumatic tire to have greater latitude of movement than would otherwise occur.

While in the foregoing I have shown and described only one specific form and construction of the elements and have set forth only one particular manner of connecting and mounting the same, it will be appreciated that changes and variations might be resorted to and hence I wish to be limited to only such points as may be set forth in the claims.

I claim:

1. A tire shoe including a corrugated supporting member to be fitted upon a tire, and a corrugated tread member carried by said supporting member having its central portion spaced somewhat therefrom.

2. A tire shoe including a supporting member shaped to be fitted upon and to conform to the lines of a tire, and a tread member clenched to said supporting member and having its central portion thereof separated and spaced from the supporting member.

3. A tire shoe including a supporting member of ring shape curved in its transverse dimension to conform substantially to the shape of a tire and corrugated in its middle portion, and a tread member of ring shape formed to have its central corrugated portion substantially flat and spaced from the supporting member with shoulders at the sides thereof merging into the edges which are brought down to fit against the edges of the supporting member, said supporting member having the extreme edges thereof bent over and clenched upon the edges of the tread member.

In testimony whereof I affix my signature in presence of two witnesses.

GUSTAF BERGKVIST.

Witnesses:
AURELIA TUYILLO,
JOE C. E. BERGKVIST.

Copies of this patent may be obtained for five cents each, by addressing the "Commissioner of Patents, Washington, D. C."